(12) United States Patent
Chevalier (10) Patent No.: US 9,515,559 B2
(45) Date of Patent: Dec. 6, 2016

(54) CHARGE PUMP CIRCUIT HAVING TWO FLY CAPACITOR MODULES

(71) Applicant: ST-Ericsson SA, Plan-les-Ouates (CH)

(72) Inventor: Laurent Chevalier, Sassenage (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 86 days.

(21) Appl. No.: 14/354,165

(22) PCT Filed: Oct. 23, 2012

(86) PCT No.: PCT/EP2012/070982
§ 371 (c)(1),
(2) Date: Apr. 25, 2014

(87) PCT Pub. No.: WO2013/060686
PCT Pub. Date: May 2, 2013

(65) Prior Publication Data
US 2014/0307493 A1     Oct. 16, 2014

Related U.S. Application Data

(60) Provisional application No. 61/563,121, filed on Nov. 23, 2011.

(30) Foreign Application Priority Data

Oct. 28, 2011   (EP) ..................................... 11306402

(51) Int. Cl.
*H02M 3/07*     (2006.01)
*H02M 3/18*     (2006.01)
(Continued)

(52) U.S. Cl.
CPC .................. *H02M 3/18* (2013.01); *G05F 3/00* (2013.01); *H02M 3/07* (2013.01); *H02M 2001/0054* (2013.01); *Y02B 70/1491* (2013.01)

(58) Field of Classification Search
CPC ............... H02M 3/07; H02M 3/18; G05F 3/00
See application file for complete search history.

(56) References Cited

U.S. PATENT DOCUMENTS

| | | | | |
|---|---|---|---|---|
| 650,422 | A * | 5/1900 | Lia | A47K 1/02 4/625 |
| 6,504,422 | B1 * | 1/2003 | Rader | H02M 3/07 327/536 |

(Continued)

FOREIGN PATENT DOCUMENTS

EP   1 753 117 A2   2/2007

OTHER PUBLICATIONS

International Search Report issued in corresponding International application No. PCT/EP2012/070982, date of mailing Dec. 21, 2012.

(Continued)

*Primary Examiner* — Timothy J Dole
*Assistant Examiner* — Ishrat Jamali
(74) *Attorney, Agent, or Firm* — Patent Portfolio Builders PLLC (57) ABSTRACT

There is described a charge pump circuit (1) circuit comprising an input terminal, an output terminal (5) connected to an intermediate node (Ni), a ground terminal (4), a first fly capacitor module (21) with a first fly capacitor (Cfly1) having a first pin (211) and a second pin (212) and connected to the intermediate node (Ni); and a second fly capacitor module (22) with a first fly capacitor (Cfly2) having a first pin (221) and a second pin (222) and connected to the intermediate node (Ni); wherein each being adapted to successively charge and discharge a the first fly capacitor and the second fly capacitor, respectively, wherein the (Continued)

second pin (212) of the first fly capacitor module (21) is connected to the first pin (221) of the second fly capacitor module (22) by a direct connection.

21 Claims, 7 Drawing Sheets (51) Int. Cl.
*G05F 3/00* (2006.01)
*H02M 1/00* (2006.01)

(56) References Cited

U.S. PATENT DOCUMENTS

| | | | | |
|---|---|---|---|---|
| 6,693,483 B2* | 2/2004 | Dem | ...................... | H02M 3/073 327/536 |
| 8,339,186 B2* | 12/2012 | Wang | ...................... | H02M 3/07 327/536 |
| 8,698,550 B2 | 4/2014 | Chevalier | | |
| 8,704,502 B2 | 4/2014 | Chevalier | | |
| 8,804,386 B2 | 8/2014 | Chevalier | | |
| 9,225,238 B2 | 12/2015 | Chevalier | | |
| 2008/0116979 A1* | 5/2008 | Lesso | ...................... | H02M 3/07 330/297 |
| 2008/0150619 A1* | 6/2008 | Lesso | ...................... | H02M 3/07 327/536 |
| 2008/0150620 A1* | 6/2008 | Lesso | ...................... | H02M 3/07 327/536 |
| 2010/0253154 A1* | 10/2010 | Yeates | ...................... | H02M 3/07 307/110 |
| 2013/0214852 A1* | 8/2013 | Chevalier | ............... | H02M 3/07 327/536 |

OTHER PUBLICATIONS

Written Opinion of the International Searching Authority issued in corresponding International application No. PCT/EP2012/070982, date of mailing Dec. 21, 2012.
European Amendment filed in corresponding European Application No. EP11306402.6 dated Oct. 31, 2013.
European Amendment filed in corresponding European Application No. EP11306402.6 dated Feb. 24, 2016.

* cited by examiner

CHARGE PUMP CIRCUIT HAVING TWO FLY CAPACITOR MODULES

BACKGROUND

Technical Field

The present invention generally relates to charge pump circuits. Charge pump circuits are voltage converters that are used in electronic devices such as mobile phones, mobile computers, personal data computers, audio devices and the like.

Charge pump circuits are used in power management circuit in order to replace switched-mode power supply (SMPS) such as boost converters or other DC/DC converters which are expensive due to the cost of an external coil. Thus the same functionality can be achieved with a charge pump circuit which uses only external capacitors.

Related Art

Charge pump circuits provide a regulated output voltage from a different input voltage. For instance the charge pump circuit can be arranged to provide a continuous voltage of +5V from an input voltage varying between 3.9V and 2.3V over time. Typical use is when the input voltage is provided by the battery of a mobile device. As the battery gets discharged, the voltage outputted by the battery diminishes. A charge pump circuit which can generate a 5V voltage from a 2.3V input voltage is, for instance a 3× charge pump circuit that outputs can achieve 3 times the input voltage. Such a charge pump circuit may comprise a tank capacitor positioned at the output of the charge pump which allows outputting a roughly continuous 5V voltage, averaging the charging output voltage and the discharging output voltage.

For some 3× charge pump circuit, the current is consumed at all times by the charge pump while it outputs current only one third of the time. Therefore, almost two thirds of the current is wasted by the charge pump circuit's inherent consumption. The inherent consumption of the charge pump circuit is roughly related to the multiplication factor between the input voltage and a maximum output voltage. Adaptable charge pump circuits are adapted to operate according to different multiplication factors.

Some charges pumps used in mobile application are adapted to operate with any of three modes: 1×5, 2× and 3×, in which, respectively, the charge pump circuit outputs, in a discharging mode, an output voltage worth one and a half times the input voltage, two times the input voltage and three times the input voltage. Therefore, when the input voltage is high, the charge pump circuit is adapted to operate with an efficient 1×5 mode that uses only 1.5 times the current outputted. Conversely, the charge pump circuit is adapted to work in the highly non-efficient 3× mode only when the input voltage is so low that no other solution is available.

Such charge pump circuits may still be improved to be more efficient, especially with higher multiplication factors. There is therefore a need to provide more efficient charge pump circuits.

SUMMARY

To address these needs, a first aspect of the present invention relates to a more concise electrical structure. The inventors propose a new architecture for charge pump circuits enabling as much flexibility as known charge pump circuit architectures while using less surface area and having a lower internal resistance. The inventors note that the charge pump circuit may be perfected so as to remove at least two switches.

Further, for charge pump circuits built on a printed circuit board (PCB) and comprising a charge pump module inside a chip, the capacitors are connected through to the chip through chip pins. The new architecture advantageously enables to build a charge pump circuit equivalent to one of the known art while using at least one less pin chip.

The chip may be a microchip such as an integrated circuit or a microprocessor or the like. The chip pins refer to any pin present on a chip to enable a link between the chip and an outer electric or electronic device. The chip pins thus refers to "through-holes" pins that are designed be welded inside holes drilled in the PCB according to the "thru-hole-technology" or to leads used in the "surface mount technology" such as short pins, flat contacts, flat metal tabs or end caps or a matrix of solder balls arranged in a ball grid array (BGA) that may be directly welded to the PCB.

In one embodiment of the present invention, the charge pump, CP, circuit comprises an input arranged to receive an input voltage Vdd, an output arranged to output an output voltage Vout and coupled to an intermediate node, a ground terminal arranged to receive a ground voltage. The CP circuit further comprises a first fly capacitor module with a first fly capacitor having a first pin and a second pin and connected to the intermediate node, and a second fly capacitor module with a second fly capacitor having a first pin and a second pin and connected to the intermediate node, wherein each fly capacitor module is adapted to successively store and discharge the first fly capacitor and the second fly capacitor, respectively.

Eventually, the second pin of the first fly capacitor is connected to the first pin of the second fly capacitor by a direct connection, defining a central node. The term "direct connection" means that the connection is done by a connection devoid of any switch or any further component.

Thus, the new charge pump circuit architecture of the invention enables a charge pump circuit comprising at least one switch less than charge pump circuits of the state of the art with two fly capacitors. Further, in state of the art multi charge pump circuits, there are usually two input connections between the two fly capacitors, one on each side of a switch comprised between the two fly capacitors. As the charge pump circuit according to the invention does not comprise any switch between the two fly capacitors, one connection to the input is redundant and may be suppressed. Accordingly the new charge pump circuit architecture of the invention enables a charge pump circuit comprising at least two less switches than corresponding charges pumps according to the state of the art.

By using one or two fewer switches, the charge pump circuit of the invention needs less surface area than other charge pump circuits and the design of the charge pump circuit is less constrained. First of all, less surface area is needed for the switches themselves. Then less surface area is need as no controller needs to address the removed switches. Those controllers may be removed. Thus, the design of the charge pump circuit needs to take into account two less switches, less controllers and fewer connections from controllers to switches.

In some embodiments of the invention the charge pump circuit is further arranged so that a filter is positioned between the intermediate node and the output, comprising at least a tank capacitor module. In such a way, as the charge pump circuit switches between charging and discharging configurations a filter may output, to a load that demands a tension, a sensibly constant output tension. Charges coming from the charge pump circuit may be stored into the tank capacitor, or directly transferred to a load, when the charge pump circuit is in a discharging configuration. Further, when the charge pump circuit is in a charging configuration, charge stored into the tank capacitor may be transferred to the load.

The filter may be of the RC type or of the RLC type if an inductor is added between the intermediate node and the tank capacitor.

Further, the CP circuit of the invention may be arranged to selectively operate according to either one of three alternative operating modes, a 1×5 mode, a 2× mode, a 3× mode, each mode enabling the CP circuit to output, at least a discharging phase, an output voltage which is 1,5, 2 or 3 times the input voltage respectively. Few architectures are know that enables a charge pump circuit comprising two fly capacitor, or at least only two fly capacitor modules to be sufficiently versatile so as to be able to output an output voltage with three different multipliers. The new charge pump circuit architecture of the invention enables a further way to form a multi charge pump circuit while further simplifying the design and enabling gains in surface area and reducing design constraints.

In further embodiments, the central node is further connected to any of the input terminal of the CP circuit, the ground terminal and the intermediate node through respective switches.

In further embodiments, the first pin of the first fly capacitor module is connected to the input of the CP circuit and to the intermediate node through respective switches. Further, the second pin of the second fly capacitor module is advantageously connected to the input of the CP circuit and to the ground terminal through respective switches.

These connections allows for the charge pump circuit of the invention to be prepared according to multiples configurations by means of closing or opening selectively the different switches. Some of those configurations may connect one or more capacitor between the input and the ground whereas some other configurations may connect one or more capacitors to the intermediate node. The multiples configurations may be alternated by groups of two, three or more, defining operating modes of the charge pump circuit.

The CP circuit may comprise a charge pump module in a chip, such as a microchip or a processor or the like. The fly capacitors are external to the chip and are connected to the charge pump module through chip pins. The charge pump module connects the input terminal and the ground terminal to both fly capacitors. According to this embodiment of the invention, the second pin of the first fly capacitor and the first pin of the second fly capacitors are connected to the chip through one and the same chip pin, called common chip pin.

The switches inside the charge pump module are advantageously transistors. Therefore, each switch has a non-negligible resistance, even as it lets current flow through it. The new charge pump circuit architecture of the invention enables a charge pump circuit with less resistance between the two capacitor modules. Thus, the charge pump circuit has an inherent consumption reduced compared to a charge pump circuit which comprises a transistor switch between the two capacitor modules. Further, as the two fly capacitors share a chip pin, design constraints on the chip are relaxed, the charge pump module needing one less chip pin.

Further, chip interconnects and chip pins have a relatively high resistance compared to a connection from a fly capacitor to the chip pin. As the two fly capacitors share the chip pin, current may flow from one fly capacitor to the other fly pin, current without needing to pass through the chip pin, nor needing to pass inside the chip between. Therefore, by the resistance between the two fly capacitors is greatly reduced in a charge pump circuit according to the invention.

The CP circuit may be assembled on a printed circuit board (PCB). In such case, the fly capacitors and the chip are positioned on the PCB. Thus, connections between the two fly capacitors have a low resistance.

According to an embodiment, the second pin of the first fly capacitor and the first pin of the second fly capacitors may be welded on a same conductive pad of the PCB, linked to a common conductive trace which is welded to the common chip pin. According to an alternative embodiment, the second pin of the first fly capacitor and the first pin of the second fly capacitors may be welded on two different conductive pads of the PCB, linked to a common conductive trace which is welded to the common chip pin. Thus, the capacitor modules may be positioned as needed on the PCB, regarding design constraint, without the connection between the two capacitor modules imposing a strain on design.

The CP circuit may comprise a controller to control the switches. If the CP circuit comprises a charge pump module, the controller is advantageously inside the chip. As the new architecture of the invention allows for a charge pump circuit with two less switches, it enables a simpler controller than in state of the art charge pumps.

Further, the controller may enable the CP circuit to operate by switching successively, in at least two phases, between at least two configuration with a given switching frequency and a given duty cycle.

Further, the controller may enable the CP circuit to operate by switching successively, in at least three phases, between at least three configuration with a given switching frequency and a given duty cycle.

Further, the controller of the CP circuit may be adapted to control the operation of the CP circuit according to one out of the at least three alternative operating modes cited above. The controller then controls the operation of the CP circuit by controlling successive openings and closings of the switches according to patterns linked to the operating mode envisioned.

The CP circuit is preferably arranged to operate by switching successively, with a given switching frequency and a given duty cycle, between at least:

a) one configuration for charging at least one fly capacitor module, connected to the input terminal through its first pin, and b) one configuration for discharging said fly capacitor module, said pin being connected to the intermediate node, the input terminal being connected to the second pin of the capacitor module.

Those two configurations alone enable the CP circuit to operate according to the 2× mode.

Further, the CP circuit may be arranged to operate by switching successively between three configurations according to a pattern. Two of the three configurations are close the two configurations aforementioned. The three configurations may comprise at least:

a1) one configuration for charging the first fly capacitor module, connected to the input terminal through its first pin, the input terminal being further connected to the intermediate node, and connected to the ground terminal through its second pin, and a2) one configuration for charging the second fly capacitor module, directly connected to the input terminal through its first pin, and to the ground terminal through its second pin, and b) one configuration for discharging both fly capacitor modules in series. The second pin of the second fly capacitor module is then advantageously connected to the input terminal. The first pin of the first fly capacitor module is advantageously connected to the intermediate node. Further, the CP circuit operates according to said configuration after operating successively into both a1) and a2) configurations in any order.

The aforementioned succession of configurations enables the charge pump circuit to operate according to a 3× mode, outputting an output voltage of three times the input voltage while the charge pump circuit is in the configuration for discharging b).

Further, the CP circuit may be arranged to operate alternately by switching successively between three other configurations, according to another pattern. The three configurations may comprise:

a) one configuration for charging both fly capacitor modules in series. The first pin of the first fly capacitor module is then advantageously connected to the input terminal. The second pin of the second fly capacitor module is then advantageously connected to the ground terminal. Eventually, the input terminal is further connected to the intermediate node.

The three configurations comprise further, in any order:

b1) one configuration for discharging the first fly capacitor module, its first pin being connected to the intermediate node, and its second pin being connected to the input terminal, and b2) one configuration for discharging the second fly capacitor module, its second pin being connected to the input terminal and its first pin being connected to the intermediate node.

The aforementioned succession of configurations enables the charge pump circuit to operate according to a 1×5 mode, outputting an output voltage of one point five times the input voltage as the charge pump circuit is in the configuration b1) for discharging and as it is in the configuration b2) for discharging.

A second aspect of the present invention relates to a chip comprising a charge pump module, enabling to form a CP circuit of the invention by connection with two fly capacitor modules which may be external modules. The chip preferably comprises at least:

a chip pin designed to be connected to a supply source with an input voltage, a chip pin for enabling a connection to a ground terminal.

The charge pump module is further connected to four more chip pins of the chip:

one chip pin for outputting an output voltage from the CP circuit, three chip pins arranged to connect two fly capacitors modules, by both of their pins to the chip, wherein one common chip pin being adapted for connecting to one pin of both capacitor modules.

A third aspect of the present invention relates to a printed circuit board, PCB, comprising at least a reception slot for a chip aforementioned. Further, the PCB comprises three conductive traces, each terminated by a different conductive pad designed to be welded to three different chip pin of the chip respectively. The three conductive traces being designed so that:

one trace connects one pin of a capacitor module to the conductive pad designed for a first chip pin, one further trace connects one pin of another capacitor module to the conductive pad designed for a second chip pin, and further, one trace connects a second pin of both capacitor modules together and further to the conductive pad for a third chip pin, each capacitor module comprising at least one capacitor. The capacitor modules may be present on the PCB or not. The capacitor modules may comprise further components, e.g.

multiples capacitors in parallel and/or in series, or even other passive components. Preferentially, the capacitor modules only have two external connections for connecting the component(s) of the capacitor module to other elements on the PCB. Each one of the two external connections is connected to one of the three conductive trace mentioned above.

In a charge pump circuit according to the invention the switches may be power MOS transistors. If the invention is applied to a charge pump circuit using power MOS, the invention allows for even more gains. Indeed, the power MOS, or any other kind of transistor induce a non-negligible resistance even when closed and allowing current to pass through them. Thus, as the new architecture of the invention enables a connection between the two fly capacitors devoid of any switches, the resistance between the two capacitors is reduced compared to a charge pump circuit designed as known before. Further, power MOS transistors are generally present inside a purpose-built module of a chip. Therefore, the new charge pump circuit architecture enables a charge pump module needing less transistors and less interconnects inside the chip than a state of the art charge pump. Further, due to the need for fewer transistors, a charge pump module according to the invention needs a reduced surface area inside the chip and therefore its design involves reduced design strains.

BRIEF DESCRIPTION OF THE DRAWINGS

Embodiments of the present invention are illustrated by way of example, and not by way of limitation, in the figures of the accompanying drawings, in which like reference numerals refer to similar elements and in which.

DESCRIPTION OF PREFERRED EMBODIMENTS

Figure 1:
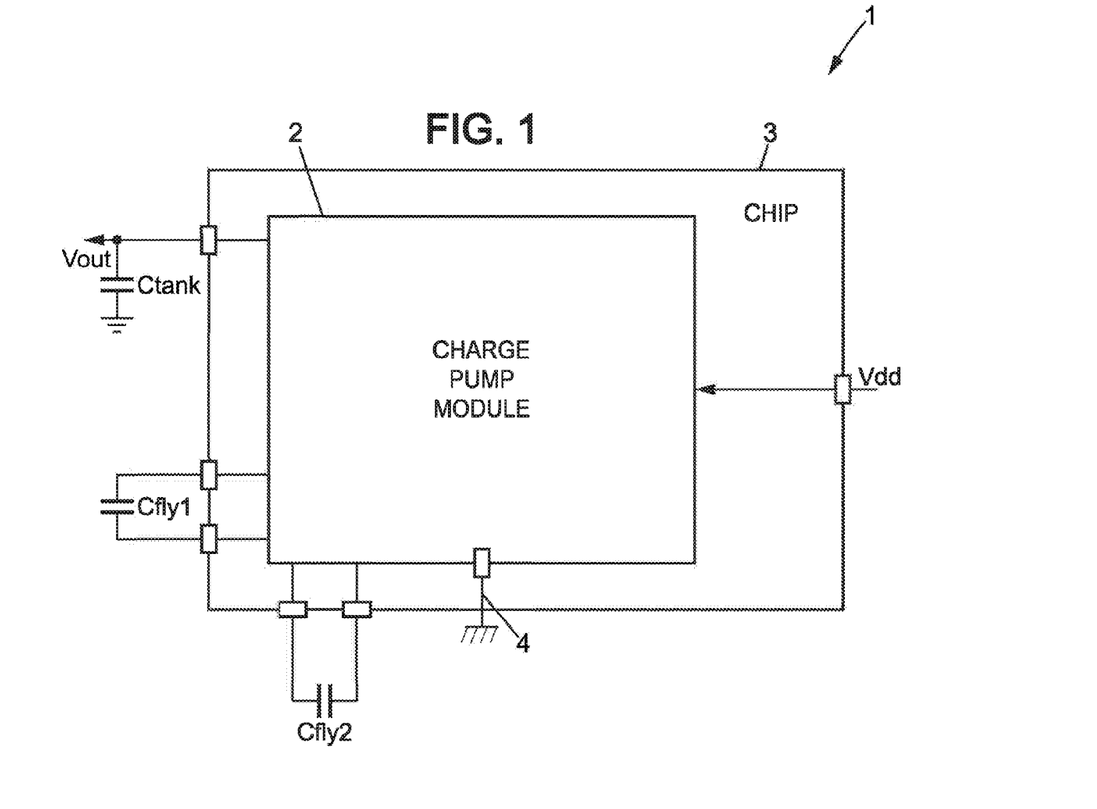
FIG. 1 is a schematic view of a charge pump circuit, comprising a chip.

A multi mode charge pump circuit is described in relation with FIG. 1. Typically, the charge pump circuit comprises a charge pump module 2 in a chip 3 and further external capacitors Cfly1, Cfly2, Ctank. The chip 3 may comprise other modules, designed to perform some operations unrelated to voltage supply. The charge pump circuit 1 comprises an input VDD and a ground connection 4 to connect the charge pump circuit 1 and the chip 3 to the ground. Two of the external capacitors are fly capacitors Cfly1, Cfly2 used as storage units to store a charge during a charging phase and to discharge the accumulated load during a discharging phase. Eventually, the third capacitor is a tank capacitor Ctank arranged to average the output of the charge pump circuit. The tank capacitor is connected by one pin on the output of the chip which is the output of the charge pump circuit and by a second pin to the ground.

The three capacitors are connected to the chip through a circuit board to which they are welded.

Figure 2:
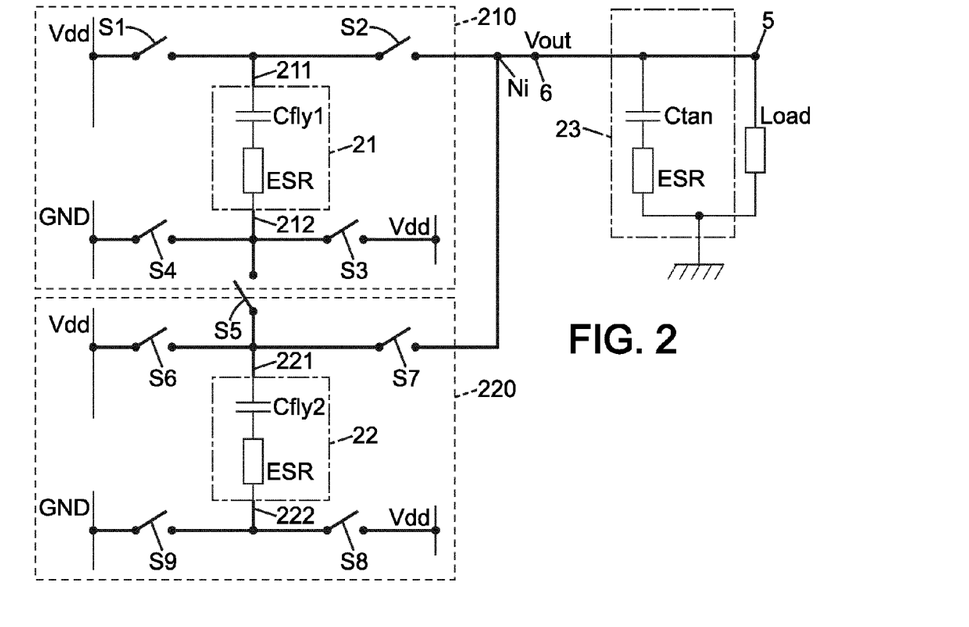
FIGS. 2 to 5 are electrical schematic diagram of a charge pump circuit illustrating operating modes.

Further to the structural aspect of a charge pump circuit, a simplified electrical diagram of such a charge pump circuit is presented in relation with FIG. 2.

A multi mode charge pump circuit 1 may comprise two fly capacitor modules 21 and 22. The capacitor modules may comprise at least one capacitor, respectively Cfly1 and Cfly2, and other components, such as resistances ESR. These resistances may correspond to the intrinsic resistance of conducting lines connecting the capacitors to other parts of the charge pump circuit.

Each of the fly capacitor modules 21 and 22 has a first pin, 211 and 221 respectively, and a second pin, 212 and 222 respectively.

On such a charge pump circuit, the first pin 211 of the first fly capacitor module 21 is connected to the input Vdd through a first switch S1, and through a second switch S2 to an intermediate node Ni and through the intermediate node Ni, to the output.

The second pin 212 is connected by a third switch S3 to the input Vdd, by a fourth switch S4 to the ground. The four aforementioned switches are arranged to control the first fly capacitor Cfly1 and form with it a first fly assembly 210.

The second pin 212 of the first fly capacitor module 21 is further connected by a fifth switch S5 to the first pin 221 of the second fly capacitor module 22. The fifth switch S5 allows for connecting and disconnecting the first fly assembly to a second fly assembly 220.

Further, the first pin 221 of the second fly capacitor module 22 is coupled through a sixth pin S6 to the input Vdd and through a seventh pin S7 to the intermediate node Ni.

Further, the second pin 222 of the second fly capacitor module 22 is coupled through an eighth pin S8 to the input Vdd and through a ninth pin S9 to the ground.

The sixth to ninth pins S6-S9 allow controlling the second fly capacitor Cfly2. The second fly assembly 220 comprises both the second fly capacitor Cfly2 and said sixth to ninth pins S6-S9.

At the output, the charge pump circuit may comprise further external components to average the outputted voltage, such as the tank capacitor module 23 comprising a tank capacitor Ctank.

The charge pump circuit described above and illustrated by the circuit diagram of FIG. 2 is arranged to output, from a given input voltage Vdd, an output voltage corresponding to the input voltage multiplied by a factor of 1.5, 2 or 3.

The number of connections to the input, the ground and the intermediate node, and the switches thereon are necessary to allow the flexibility in multiplier factor.

Figure 3:
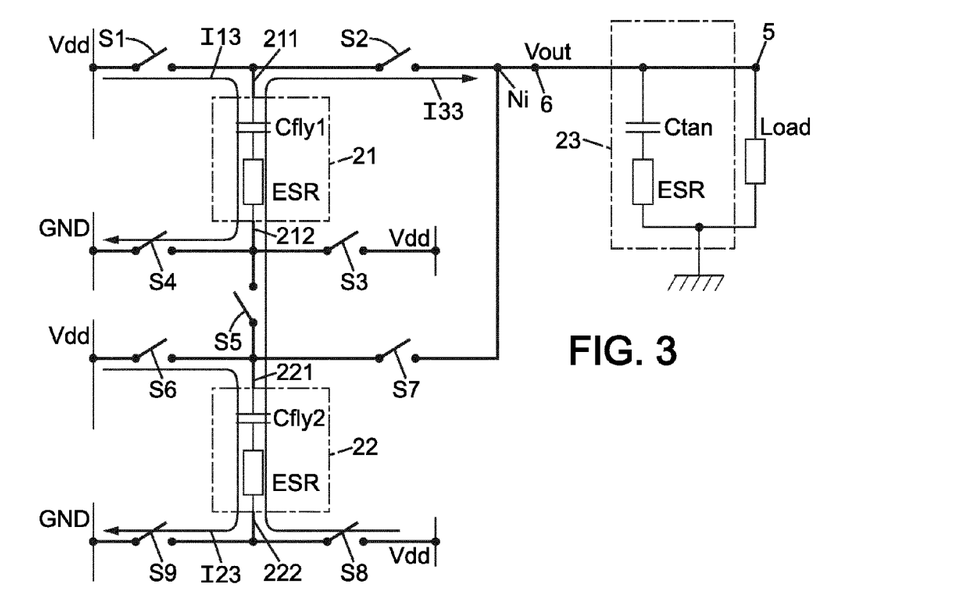
Figure 4:
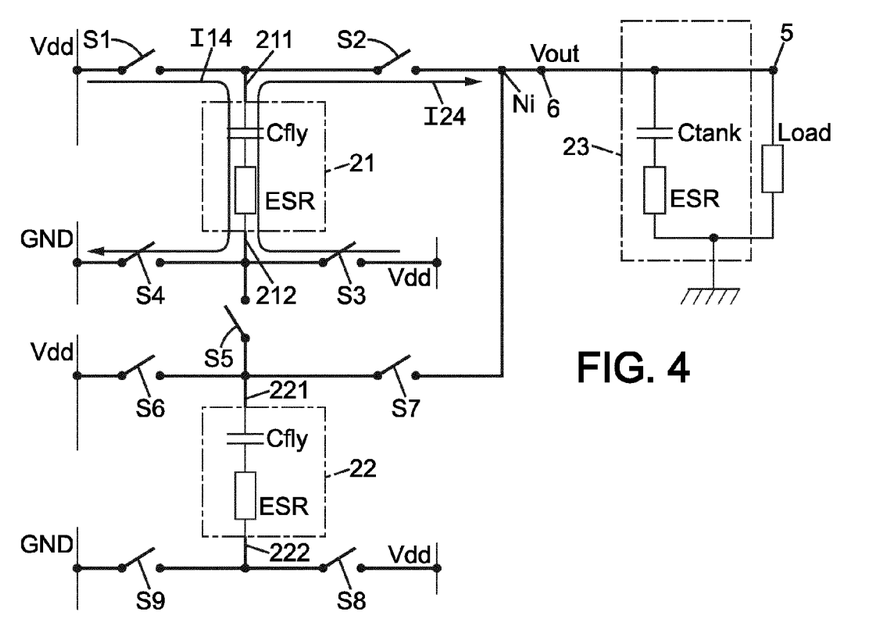
Figure 5:
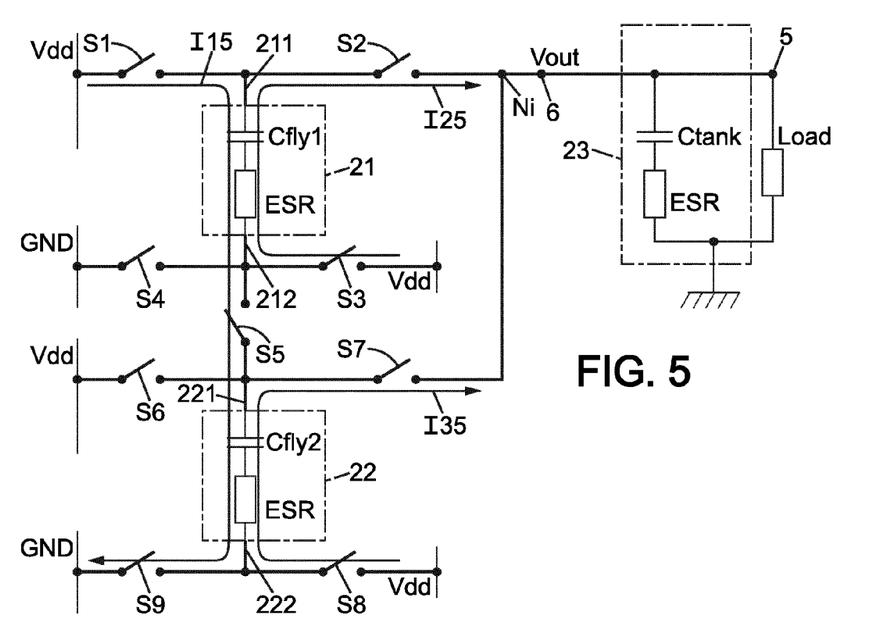

As an illustration, the three operating modes are described respectively with FIG. 3 to FIG. 5

FIG. 3 illustrates a charge pump circuit operating so as to output a voltage with a 3× multiplication factor.

Such an operating mode comprises three phases: two charging phases during which the charge pump circuit is configured so as to charge only one capacitor module by phase, and one discharging phase during which both capacitor modules are discharged in additive mode with the input voltage.

A first charging phase is illustrated by the first load current I13. Switches S2, S3 and the fifth to ninth switches S5-S9 are opened and the first and fourth switches S1, S4 are closed. Thus the first fly capacitor module 21 is connected between the input Vdd and the ground, the first pin 211 being connected to the input. A first charge is stored into the first fly capacitor Cfly1. The input transmits to the CP circuit a first load current I13 that is not transmitted to the output, but sunk to ground.

In a second charging phase, switches S7, S8 and the first to fifth switches S1-S5 are opened and the sixth and ninth switches S6, S9 are closed. Thus the second fly capacitor module 22 is connected between the input Vdd and the ground, the first pin 221 being connected to the input. A second charge is stored into the second fly capacitor Cfly2. The input transmits to the CP circuit a second load current I23 that is not transmitted to the output, but sunk to ground.

Then in a discharging phase, switches S1, S3, S4, S6, S7, S9 are opened and the second, fifth and eighth switches S2, S5, S8 are closed. Thus, the first fly capacitor module 21 and the second fly capacitor module 22 are connected in series between the input Vdd and the intermediate node Ni. Further, the first pins 211, 221, which were connected to the input during the charging phases, are coupled to the intermediate node. In this way, the first and second charges stored in the two fly capacitors are added to the input voltage. The output voltage of the discharging phase is thus three times the input voltage. The input can transmit to the CP circuit an output load current I33 that is transmitted to the output to be used by a load.

Therefore the charge pump circuit consumes three load currents I13, I23, I33 while being able to output the output load current I33 only, thus during only one phase out of three.

FIG. 4 illustrates a charge pump circuit operating so as to output a voltage with a 2× multiplication factor.

Such an operating mode comprises two phases and only involves the first fly capacitor module 21.

A charging phase is illustrated by the first load current I14. Switches S2, S3 and the fourth to ninth switches S4-S9 are opened and the first and fourth switches S1, S4 are closed. Thus the first fly capacitor module 21 is connected between the input Vdd and the ground, the first pin 211 being connected to the input. A first charge is stored into the first fly capacitor Cfly1. The input transmits to the CP circuit a first load current I14 that is not transmitted to the output, but sunk to ground.

Then in a discharging phase, switch S1 and the fourth to ninth switches S4-S9 are opened and the second and third switches S2, S3 are closed. Thus, the first fly capacitor module 21 is connected between the input Vdd and the intermediate node Ni in a reverse way as that of the charging phase. Accordingly, the first pin 211, which was connected to the input during the charging phase, is connected to the intermediate node. In this way, the first charge accumulated in the fly capacitor is added to the input voltage. The output voltage of the discharging phase is thus two times the input voltage. The input can transmit to the CP circuit an output load current I24 that is transmitted to the output to be used by a load.

Therefore the charge pump circuit consumes two load currents I14, I24 while being able to output the output load current I24 only, during one phase out of two. The inherent consumption of the charge pump circuit in the 2× mode is therefore less than in the 3× mode.

FIG. 5 illustrates a charge pump circuit operating so as to output a voltage with a 1×5 multiplication factor.

Such an operating mode comprises three phases: a charging phase during which the charge pump circuit is configured to charge both capacitor modules in series, and two discharging phases during which one of the two capacitor modules is discharged in additive mode with the input voltage.

A charging phase is illustrated by the first load current I15. Switches S2, S3, S4, S6, S7, S9 are opened and the first, fifth and eighth switches S1, S5, S8 are closed. Thus the first fly capacitor module 21 and the second fly capacitor module 22 are connected in series between the input Vdd and the ground GND. The first pins 211, 221 are connected to the input. A first half charge is stored into the each fly capacitor Cfly1, Cfly2. The input transmits to the CP circuit a first load current 115 that is not transmitted to the output, but sunk to ground.

Then in a first discharging phase, switch S1 and the fourth to ninth switches S4-S9 are opened and the second and third switches S2, S3 are closed. Thus, the first fly capacitor module 21 is connected between the input Vdd and the intermediate node Ni in a reverse way as that of the charging phase. Accordingly, the first pin 211, which was connected to the input during the charging phase, is connected to the intermediate node. Thus, the first half charge stored in the first fly capacitor Clfy1 is added to the input voltage. The output voltage of the first discharging phase has thus a value equal to one and a half times the input voltage value. The input can transmit to the CP circuit a first output load current 125 that is transmitted to the output and may be used by a load.

Then in a second discharging phase, the first to sixth switches S1-S6 and the ninth switch S9 are opened and the seventh and eighth switches S7, S8 are closed. Thus, the second fly capacitor module 22 is connected between the input Vdd and the intermediate node Ni in a reverse way as that of the charging phase. Accordingly, the first pin 221, which was connected to the input during the charging phase, is connected to the intermediate node. In this way, the second half charge stored in the second fly capacitor Cfly2 is added to the input voltage. The output voltage of the second discharging phase is thus equal to one and a half times the input voltage. The input can transmit to the CP circuit a second output load current I35 that is transmitted to the output and may be used by a load.

Therefore the charge pump circuit consumes three load currents I15, I25, I35 and is able to output output load currents I25, I35 during two phases out of three. The inherent consumption of the charge pump circuit in the 1×5 mode is therefore less than in the 3× mode and the 2× mode.

However, as stated above, such charge pump circuits may still be improved regarding their current consumption.

Figure 6:
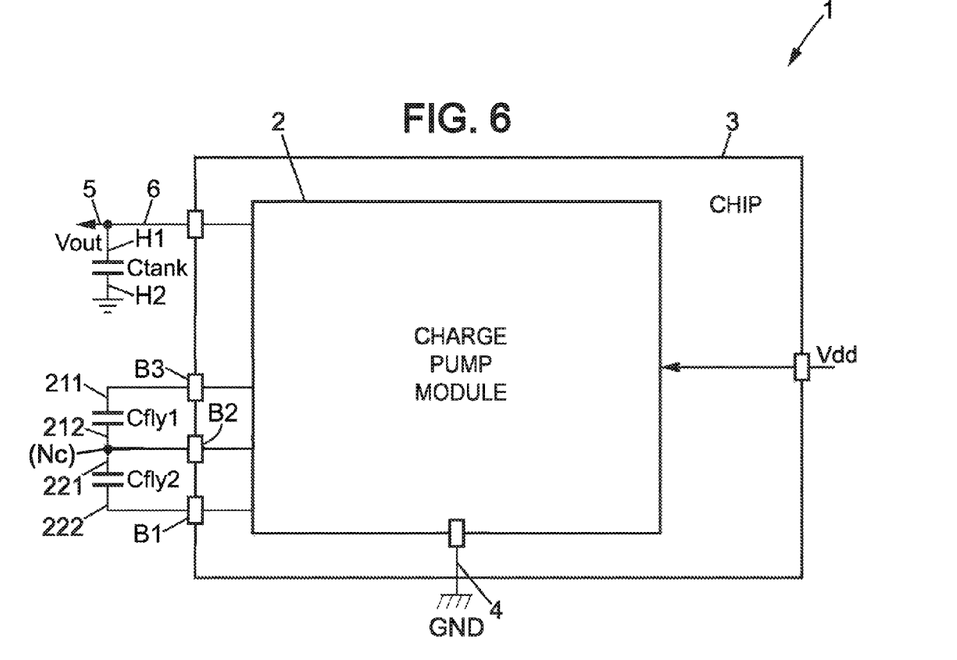
FIG. 6 is a schematic view of a charge pump circuit comprising a chip in one embodiment of the invention.

A general principle of the invention is described with regard to FIG. 6. Typically, the charge pump circuit 1 comprises a charge pump module 2 in a chip 3 and external capacitors Cfly1, Cfly2, Ctank. The chip 3 may comprise other modules, designed to perform some operations unrelated to voltage supply. The charge pump circuit 1 comprises an input Vdd and a ground connection 4 to connect the charge pump circuit 1 and the chip 3 to the ground. Two of the external capacitors are a first fly capacitor Cfly1 and a second fly capacitor Cfly2, used as storage units for storing a charge during a charging mode and to discharge the accumulated load during a discharging mode. Eventually, the third capacitor is a tank capacitor Ctank, arranged to average the output of the charge pump circuit. The tank capacitor is connected by one pin H1 to both an output 5 of the charge pump circuit 1 and an output 6 of the chip 3 and by a second pin H2 to the ground.

The three capacitors Cfly1, Cfly2, Ctank are connected to the chip through a circuit board to which they are welded.

In the charge pump circuit illustrated in FIG. 1, there are four chip pins devoted to connections to the two fly capacitors, each chip pin being connected to only one capacitor.

Conversely, in the embodiment of the invention illustrated in FIG. 6, the two fly capacitors Cfly1 and Cfly2 are connected to the chip 3 through only three chip pins B1, B2, B3. Accordingly, the two fly capacitor Cfly1 and Cfly2 share one of the chip pins B2.

The first fly capacitor Cfly1 has a first pin 211 and a second pin 212. The second fly capacitor Cfly1 has a first pin 221 and a second pin 222. In particular, according to the invention, the second pin 212 of the first fly capacitor Cfly1 is connected to the chip 3 through the same chip pin B2 as the first pin 221 of the second fly capacitor Cfly2.

In an exemplary embodiment of the invention, the two pins may be welded together with the chip pin B2. Alternatively, the two pins 212, 221 may be welded to a connector, called central node Nc thereafter, which is welded with the chip pin B2.

If the chip 3 and the capacitors Ctank, Cfly1, Cfly2 are present on a printed circuit board (PCB), the two pins 212, 221 may be welded on two different conductive pads. The central node is therefore advantageously a common conductive trace linked to the two conductive pads. Said common conductive trace is further welded to the common chip pin B2. Alternatively, the two pins 212, 221 may be welded on a common conductive pad on the PCB.

One advantage of the invention is therefore to allow a multi-mode charge pump circuit which needs one less chip pin from the chip to operate. A chip pin has a resistance that is relatively important. Further, the chip pin is linked to the chip and to the PCB by solder connections. The chip pin and the solder connections increase the resistance imposed to a current flowing through the chip pin. As the invention allows for a charge pump circuit 1 with one less chip pin, the charge pump circuit has a global resistance that is reduced compared to known devices.

Therefore, the resistance power dissipation of the charge pump circuit is reduced compared to the state of the art.

Further, FIGS. 7 to 10 illustrate an embodiment of a charge pump circuit according to the invention operating according to different operating modes.

Figure 7:
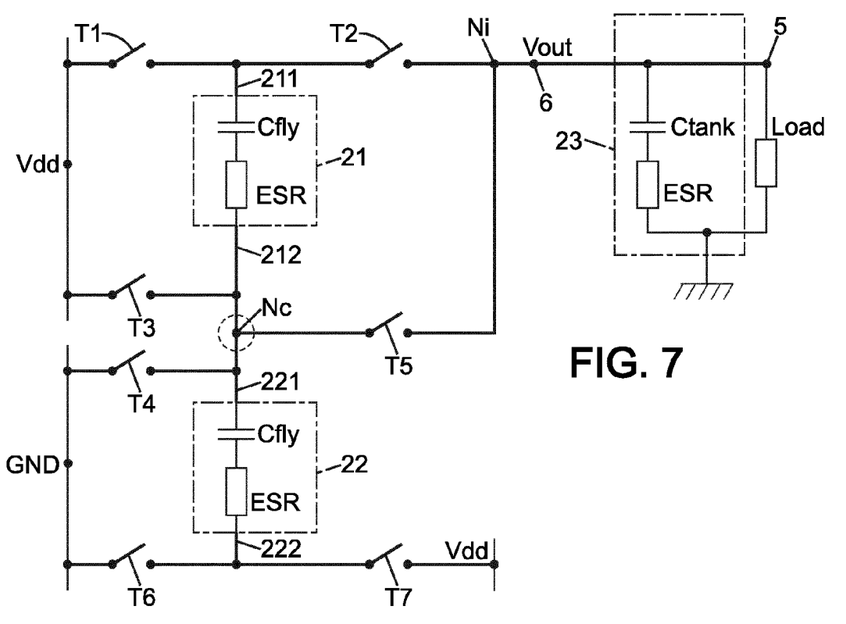
FIGS. 7 to 10 are electrical schematic diagram of a charge pump circuit according to embodiments of the invention, illustrating operating modes.

A multi mode charge pump circuit of the invention 1 comprises two fly capacitor modules 21, 22. The fly capacitor modules may each comprise at least one fly capacitor, Cfly1 and Cfly2 respectively, and other components, such as resistances ESR. These resistances may correspond to the intrinsic resistance of conductive lines connecting the capacitors to other parts of the charge pump circuit.

Each of the fly capacitor modules 21 and 22 has a first pin, 211 and 221 respectively, and a second pin, 212 and 222 respectively.

On such a charge pump circuit, the first pin 211 of the first fly capacitor module 21 is connected to the input Vdd through a first switch T1, and through a second switch T2 to an intermediate node Ni and through the intermediate node Ni to the output.

The second pin 212 is directly connected to a central node Nc, by a connection devoid of switches. The central node is connected by a third switch T3 to the input Vdd and by a fourth switch T4 to the ground.

The central node Nc is further directly connected to the first pin 221 of the second fly capacitor module 22, by a connection devoid of switches.

Further, the central node Nc is connected through a fifth switch T5 to the intermediate node Ni.

Further, the second pin 222 of the second fly capacitor module 22 is connected T6 to the ground terminal GND through a sixth switch, and to the input terminal Vdd through a seventh switch T7.

At the output, the charge pump circuit may comprise further external components to average the outputted voltage, such as a tank capacitor module 23 comprising a tank capacitor Ctank positioned in parallel with the charge pump circuit.

The charge pump circuit described above and illustrated by the circuit diagram of FIG. 7 is arranged to selectively output, from an input voltage, an output voltage corresponding to the input voltage multiplied by any of a 1.5, 2 or 3 factor.

As will be described thereafter, the number of connections and of switches thereon is sufficient to allow the charge pump module to operate according to the three aforementioned multiplier modes. Accordingly, with only seven switches, the charge pump circuit 1 of the invention has an identical flexibility as charge pump circuits that use up to nine switches.

The switches each have an innate consumption to switch from an open position to a closed position and vice-versa.

Further, if the charge pump module comprises a charge-pump module in a chip, such as a microchip, the switches are comprised in it and are generally transistors. Such transistors have an inherent resistivity. Therefore, a multi charge pump module of the invention, with two less switches than some other charges pumps, has less intrinsic resistivity.

Further, actuating switches involves controllers and connections to connect the controllers to the switches. Such controllers and connections impose complications of designs rules for the charge pump circuit. In particular the controllers and connections occupy surface area, either on the PCB or in the chip. Furthermore, the switches themselves represent a non-negligible area.

Therefore, multi charge pump circuit of the invention may be designed with less surface strain as it uses two less switches than the state of the art. Firstly, less surface is needed for the switches themselves. Secondly, less controller and connections are needed. Therefore, the invention allows for relaxing design strains for the charge pump circuit. Moreover, intrinsic consumption is reduced due to lower switching losses.

Figure 8:
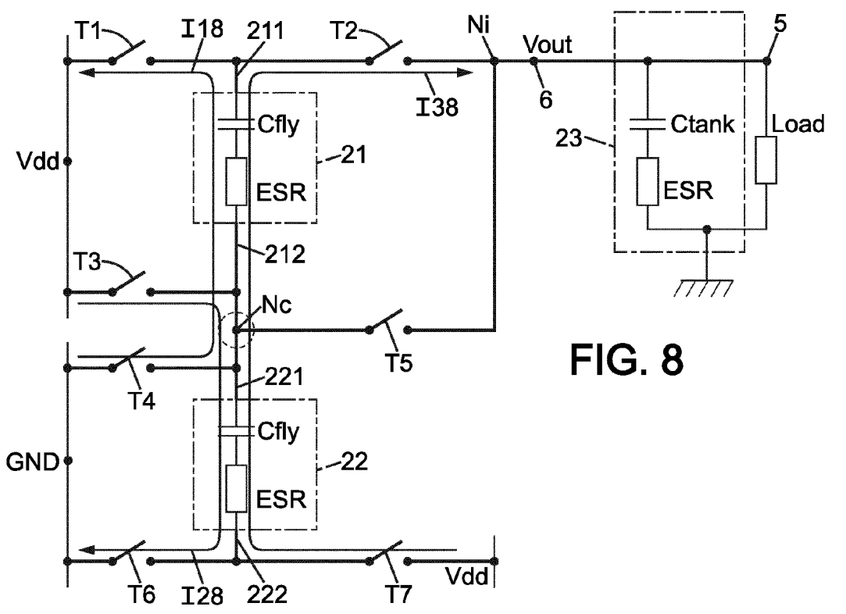

FIG. 8 illustrates a charge pump circuit operating so as to output a voltage with a 3× multiplication factor.

Such an operating mode comprises three phases: two charging phases during which the charge pump circuit is configured so as to charge only one capacitor module, and one discharging phase during which both capacitor modules are discharged in additive mode with the input voltage.

A first charging phase is illustrated by the first load current I18. Switches T2, T3 and the fifth to seventh switches T5-T7 are opened and the first and fourth switches T1, T4 are closed. Thus the first fly capacitor module 21 is connected between the input Vdd and the ground GND. The first pin 211 is connected to the input and the second pin 212 is connected to the ground through the central node. A first charge is stored into the first fly capacitor Cfly1. The input transmits to the CP circuit a first load current I18 that is not transmitted to the output but sunk to ground. Further, as the sixth and seventh switches T6, T7 are opened, the second fly capacitor module 22 is neither charged nor discharged during the first charging phase.

In a second charging phase, switches T1, T2, T4, T5, and T7 are opened and the third and sixth switches T3, T6 are closed. Thus the second fly capacitor module 22 is connected between the input Vdd, and the ground. The first pin 221 is connected to the input through the central node Nc. A second charge is stored into the second fly capacitor Cfly2. The input transmits to the CP circuit a second load current I28 that is not transmitted to the output but sunk to ground.

Then in a discharging phase, switches T1, T3, T4, T5, and T6 are opened and the second and seventh switches T2, T7 are closed. Thus, the first fly capacitor module 21 and the second fly capacitor module 22 are connected in series between the input Vdd and the intermediate node Ni. Further, the first pins 211, 221, which were connected to the input during the charging phases, are connected to the intermediate node Ni. Accordingly the first and second charges stored in the two fly capacitors are both added to the input voltage. The output voltage during the discharging phase is thus three times that of the input voltage.

The input can transmit to the CP circuit an output load current I38 that is transmitted to the output to be used by a load.

The output load current I38 flows from the second fly capacitor module 22 to the first fly capacitor module 21 without passing through any switches.

Further, if the charge pump circuit comprises a charge pump module inside a chip, the second pin 212 of the first fly capacitor module 21 and the first pin 221 of the second fly capacitor module may be connected to each other by further means than a direct connection to a common chip pin. Indeed, a common conductive pad, or at least a common conductive trace may connect directly the two aforementioned capacitor pins together. In such a case, the output load current I38 flows between the two fly capacitor modules without passing through any chip pin.

The charge pump circuit assembly according to the invention enables important reduction in resistivity in the discharging phase of the 3× operating mode. Indeed, the output load current I38 may flow between the two fly capacitors modules while encountering one less switch and two less chip pins than in the charge pump circuit illustrated with regard to FIGS. 1 to 3.

Figure 9:
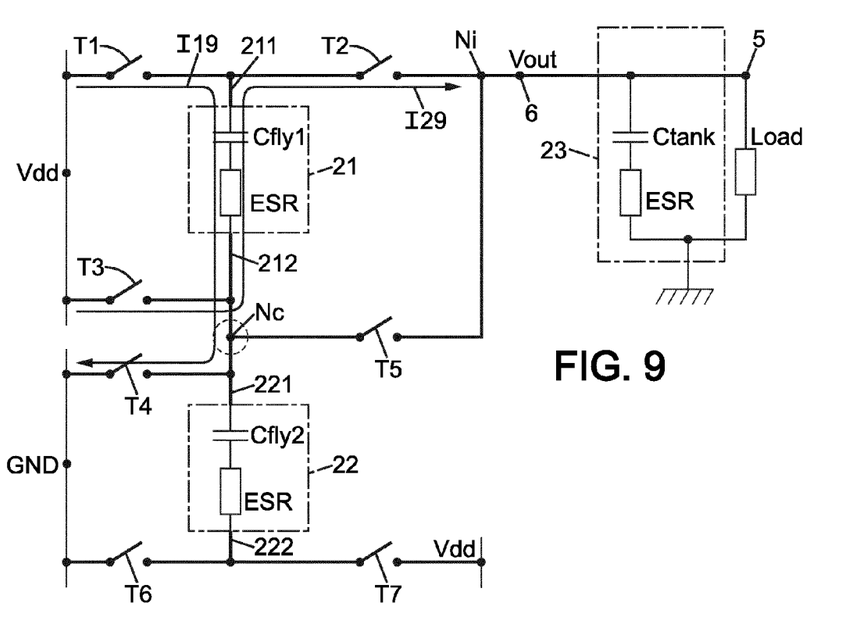

FIG. 9 illustrates a charge pump module according to an embodiment of the invention operating so as to output a voltage with a 2× multiplication factor.

The exemplary operating mode comprises two phases and only involves the first fly capacitor module 21.

A charging phase is illustrated by the flow of a first load current I19. The second and third switches T2 and T3 as well as the fifth to seventh switches T5-T7 are opened, and the first and fourth switches T1 and T4 are closed. Thus the first fly capacitor module 21 is connected between the input Vdd and the ground. The first pin 211 is connected to the input. A first charge is stored into the first fly capacitor Cfly1. The input transmits to the CP circuit a first load current I19 that is not transmitted to the output but sunk to ground.

Then in a discharging phase, first switch T1 and the fourth to seventh switches T4-T7 are opened, and the second and third switches T2 and T3 are closed.

Thus, the first fly capacitor module 21 is connected between the input Vdd and the intermediate node Ni in a reverse way as that of the charging phase. Accordingly, the first pin 211, which was connected to the input during the charging phase, is connected to the intermediate node Ni. Thus the first charge accumulated in the fly capacitor is added to the input voltage. The output voltage during the discharging phase is thus two times that of the input voltage. The input can transmit to the CP circuit an output load current I29 that is transmitted to the output and may be used by a load.

In this operating mode, the charge pump circuit consumes two load currents I19, I249 while being able to output an output load current I29 during one phase out of two. The inherent consumption of the charge pump circuit in the 2× mode is therefore less than in the 3× mode.

Figure 10:
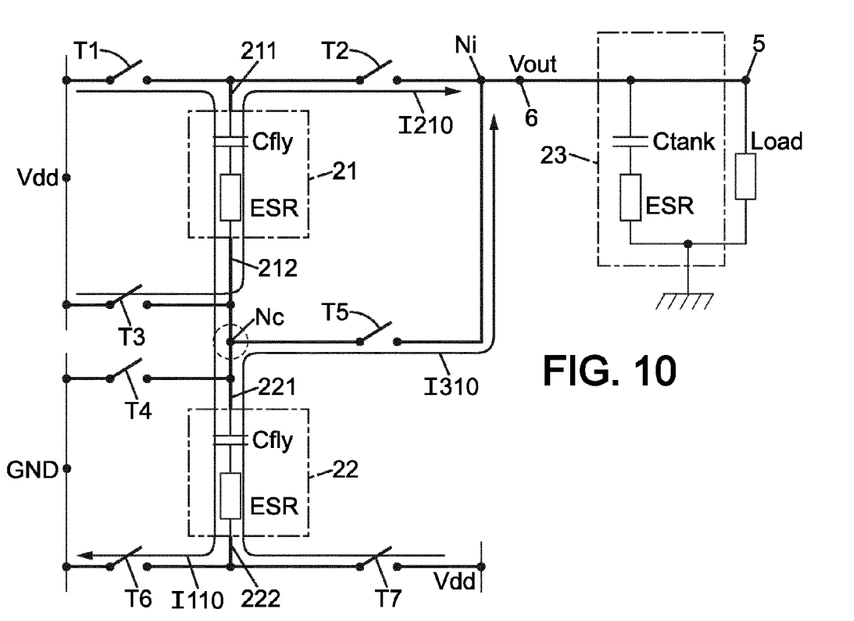

FIG. 10 illustrates a charge pump module according to an embodiment of the invention operating so as to output a voltage with a 1×5 multiplication factor.

Such an operating mode comprises three phases: a charging phase during which the charge pump circuit is configured to charge both fly capacitor modules in series, and two discharging phases during which one of the two capacitor modules is discharged in additive mode with the input voltage.

The charging phase is illustrated by the flow of a first load current I110. Switches T2, T3, T4, T5, and T7 are opened and the first and sixth switches T1, T6 are closed. Thus the first fly capacitor module 21 and the second fly capacitor module 22 are connected in series between the input Vdd and the ground. The first pins 211, 221 are coupled to the input. A first half charge is stored into the each fly capacitor Cfly1, Cfly2. The input transmits to the CP circuit a first load current I110 that is not transmitted to the output but sunk to ground.

The first load current I110 flows from the first fly capacitor module 21 to the second fly capacitor module 22 without passing through any switch.

Further, if the charge pump circuit comprises a charge pump module in a chip, the second pin 212 of the first fly capacitor module 21 and the first pin 221 of the second fly capacitor module may be connected to each other by other means than a direct connection to a common chip pin. Indeed, a common conductive pad, or a common conductive trace on the PCB may connect directly the two aforementioned capacitor pins together. In such a case, the first load current I110 flows between the two fly capacitor modules without passing through any chip pin.

Therefore, the charge pump circuit assembly according to the invention enables important gains in resistivity during the charging phase of the 1×5 operating mode. Indeed, the first load current I110 may flow between the two fly capacitors modules while encountering one less switch and two less chip pins than in former charge pump circuits. Therefore, the first load current I110 used to charge the two fly capacitor modules may be smaller than in a state of the art charge pump circuit while providing an identical half charge to each fly capacitor Cfly1, Cfly 2.

Then in a first discharging phase, switch T1 and the fourth to seventh switches T4-T7 are opened and the second and third switches T2, T3 are closed. Thus, the first fly capacitor module 21 is connected between the input Vdd and the intermediate node Ni in a reverse way as that of the charging phase. The first fly capacitor module 21 is connected to the input Vdd through the central node Nc. Accordingly, the first pin 211, which was connected to the input in the charging phase, is connected to the intermediate node. Thus, the first half charge stored in the first fly capacitor Cfly1 is added to the input voltage. The output voltage during the first discharging phase is thus equal to one and a half times the input voltage.

The input can transmit to the CP circuit a first output load current I210 that is transmitted to the output and may be used by a load.

Then in a second discharging phase, the first to fourth switches T1-T4 and the sixth switch T6 are opened and the fifth and seventh switches T5, T7 are closed. Thus, the second fly capacitor module 22 is connected between the input Vdd and the intermediate node Ni in a reverse way as that of the charging phase. Further, second fly capacitor module 21 is connected to the intermediate node N1 through the central node Nc. Accordingly, the first pin 221, which was connected to the input in the charging phase, is connected to the intermediate node. Thus, the second half charge stored in the second fly capacitor Cfly2 is added to the input voltage. The output voltage during the second discharging phase is thus equal to one and a half times the input voltage. The input can transmit to the CP circuit a second output load current I310 that is transmitted to the output and may be used by a load.

The charge pump circuit consumes three load currents I110, I210, I310 while being able to output an output load current I210, I310 during two phases out of three. The inherent consumption of the charge pump circuit in the 1×5 mode is therefore less than in both the 3× mode and the 2× mode.

Further, the current consummated by the charge pump circuit during the charging mode the two half charges is less than in other charge pump circuits. Therefore, the inherent consumption of the charge pump circuit of the invention is smaller, in 1×5 mode, than in another charge pump circuit.

The person skilled in the art would easily understand that in the 3× operating mode the first charging phase and second charging phase may be inverted, and that in the 1×5 operating mode the first discharging phase and second discharging phase may be inverted.

The person skilled in the art will further understand that in the charge pump circuits of the invention, any capacitor may to be replaced by an assembly of components adapted to function as an indivisible capacitor module in the sense of the invention. The assembly of components may comprise a group of smaller capacitors in series, in parallel, or even other electric or electronic components such as transistors. . .

Figure 11A:
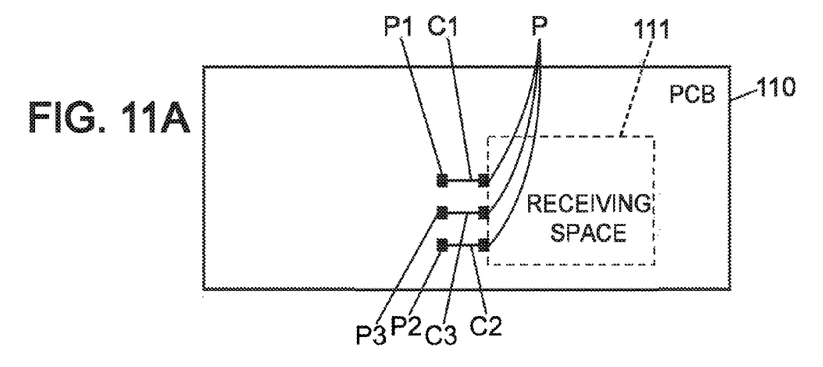
FIGS. 11A to 11C are schematic view in block diagram illustrating a PCB according to the invention.
Figure 11B:
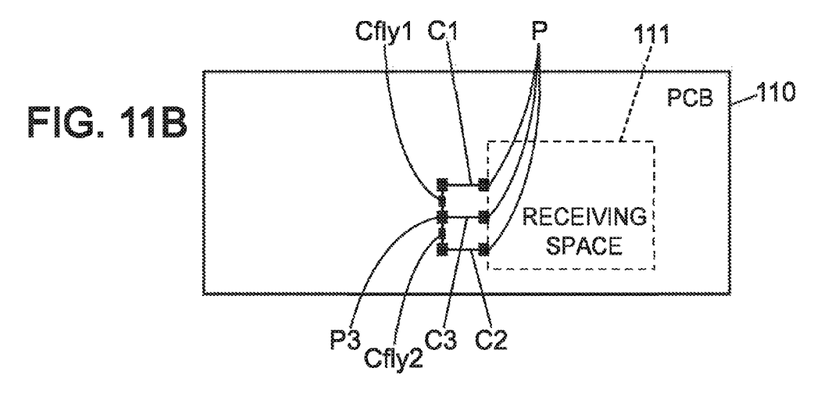
Figure 11C:
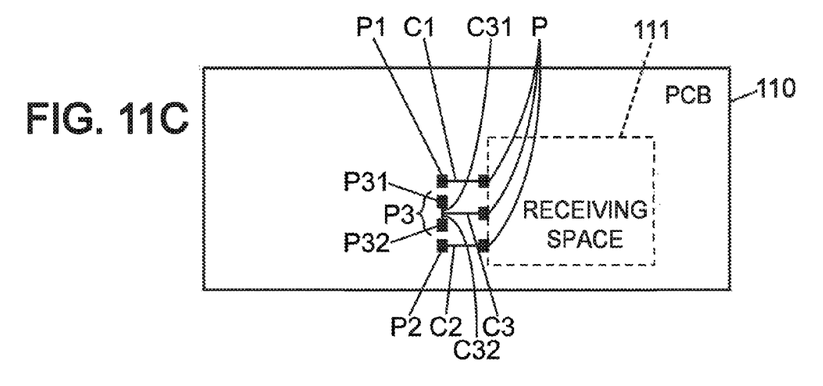

The invention is further related to a printed circuit board designed to enable the formation of a charge pump circuit of the invention by combination with a chip with a charge pump module and with at least two fly capacitor modules (FIG. 11A to FIG. 11C).

Such PCB 110 then may comprise a receiving space 111 adapted for mounting a chip. The receiving space 111 has generally telltale signs of the planned addition of a chip. Such telltale signs may comprise multiples pads grouped as needed for a chip. The PCB 111 comprises at least three conductive traces C1, C2, C3. Each of the three conductive traces C1, C2, C3 is connected to a pad P adapted to be connected to a chip pin of the chip. A first conductive trace C1 connects a first pad P1 to a pad P adapted to be connected to a chip pin of the chip. A second conductive trace C2 connects a second pad P2 to a pad P adapted to be connected to a chip pin of the chip.

Further, a third conductive trace C3 connects a common pad P3, adapted to be welded simultaneously to two pins from two different components, to a pad P adapted to be connected to a chip pin of the chip.

The common pad P3 may be connected with the first pad P1 and with the second pad P2 by a first fly capacitor Cfly1 and a second fly capacitor Cfly2 respectively (FIG. 11B).

In an alternative PCB, the main difference relates to the shape of the third conductive trace C3 (FIG. 11C). The third conductive trace C3 may comprise a first part C31 connected to a first common pad P31 and a second part C32 connected to a second common pad P32. The third conductive trace C3 is further connected to a pad P adapted to be connected to a chip pin of the chip.

The first common pad P31 is adapted to be welded to a pin of a first component that is welded to the first pad P1 by another pin. The second common pad P32 is adapted to be welded to a pin of a second component that is welded to the second pad P1 by another pin.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above.

Therefore, it is intended that the present invention not be limited to the particular embodiments disclosed, but that the invention include all embodiments falling within the scope of the appended claims.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A Charge pump circuit, CP, circuit comprising:
an input terminal arranged to receive an input voltage,
an output terminal arranged to output an output voltage and coupled to an intermediate node,
a ground terminal arranged to receive a ground voltage,
a first fly capacitor module with a first fly capacitor having a first pin and a second pin and connected to the intermediate node; and,
a second fly capacitor module with a second fly capacitor having a first pin and a second pin and connected to the intermediate node;
wherein the first and second fly capacitor modules are adapted to successively charge and discharge the first fly capacitor and the second fly capacitor, respectively,
wherein the second pin of the first fly capacitor module is connected to the first pin of the second fly capacitor module by a direct connection without any intervening switches,
the CP circuit further arranged to selectively operate according to any one of a set of three alternative operating modes, said set consisting of a 1.5 mode, a 2× mode, and a 3× mode, each mode enabling the CP circuit to output, at least in a discharging phase, an output voltage which is 1.5, 2 or 3 times the input voltage, respectively,
wherein the charge pump circuit is operated in three phases to provide the 3× boost factor, including two charging phases and a discharging phase, and
wherein the charge pump circuit is operated in three phases to provide the 1.5 × boost factor, including a single charging phase and two discharging phases.

2. The CP circuit of claim 1, wherein the CP circuit operates according to any one of the set of three alternative operating modes using only two fly capacitors and seven switches, wherein the only two fly capacitors include the first and second fly capacitors.

3. The CP circuit of claim 2, further comprising a filter arranged in series between the intermediate node and the output, said filter comprising at least a tank capacitor module.

4. The CP circuit of claim 2, wherein the second pin of the first fly capacitor module and the first pin of the second fly capacitor module are directly connected to each other by a central node, wherein the central node is connected to the input of the CP circuit through at least one first switch, to the ground terminal through a single second switch, and to the intermediate node through at least one third switch.

5. The CP circuit of claim 4, wherein each of the switches comprises at least one power MOS transistor.

6. The CP circuit of claim 2, wherein the first pin of the first fly capacitor module is connected to the input of the CP circuit and to the intermediate node through respective switches and the second pin of the second fly capacitor module is connected to the input of the CP circuit and to the ground terminal through respective switches.

7. The CP circuit of claim 2, further comprising a charge pump module in a chip, wherein the fly capacitors are external to the chip and are connected to the charge pump module through chip pins, wherein the charge pump module connects the input terminal, and the ground terminal, to both fly capacitors and wherein the second pin of the first fly capacitor module and the first pin of the second fly capacitor module are connected to the chip through one and the same chip pin.

8. The CP circuit of claim 7, wherein the fly capacitors and the chip are positioned on a printed circuit board, PCB, the second pin of the first fly capacitor module and the first pin of the second fly capacitor module being welded on a same conductive pad of the PCB, linked to a common conductive trace which is welded to said chip pin.

9. The CP circuit of claim 7, wherein the capacitors and the chip are positioned on a printed circuit board, PCB, the second pin of the first fly capacitor module and the first pin of the second fly capacitor module being welded on two different conductive pads of the PCB, linked to a common conductive trace which is welded to said chip pin.

10. The CP circuit of claim 2, wherein the CP circuit is arranged to operate by switching successively, with a given switching frequency and a given duty cycle, between at least two configurations, which comprises at least:
a) one configuration for charging at least one fly capacitor module, connected to the input terminal through its first pin, and
b) one configuration for discharging said fly capacitor module, said first pin being connected to the intermediate node, the input terminal being connected to the second pin of the capacitor module.

11. The CP circuit of claim 10, wherein the CP circuit is arranged to operate by switching successively between three configurations, which comprises at least:
a1) one configuration for charging the first fly capacitor module, connected to the input terminal through its first pin and connected to the ground terminal through its second pin, the input terminal being further connected to the intermediate node, and
a2) one configuration for charging the second fly capacitor module, directly connected to the input terminal through its first pin, and to the ground terminal (GND) through its second pin, and
b) one configuration for discharging both fly capacitor modules in series, the second pin of the second fly capacitor module being connected to the input terminal and the first pin of the first fly capacitor module being connected to the intermediate node, said configuration being operated after operating successively into both a1) and a2) configurations in any order.

12. The CP circuit of claim 10, wherein the CP circuit is arranged to operate by switching successively between three configurations, which comprises at least:
a) one configuration for charging both fly capacitor modules in series, the first pin of the first fly capacitor module being connected to the input terminal and the second pin of the second fly capacitor module being connected to the ground terminal, the input terminal being further connected to the intermediate node, and and, in any order:
b1) one configuration for discharging the first fly capacitor module, its first pin being connected to the intermediate node, and its second pin being connected to the input terminal, and
b2) one configuration for discharging the second fly capacitor module, its second pin being connected to the input terminal and its first pin being connected to the intermediate node.

13. A chip, comprising:
a charge pump circuit, comprising
an input terminal arranged to receive an input voltage,
an output terminal arranged to output an output voltage and coupled to an intermediate node,
a ground terminal arranged to receive a ground voltage,
a first fly capacitor module with a first fly capacitor having a first pin and a second pin and connected to the intermediate node; and,
a second fly capacitor module with a second fly capacitor having a first pin and a second pin and connected to the intermediate node;
wherein the first and second fly capacitor modules are adapted to successively charge and discharge the first fly capacitor and the second fly capacitor, respectively,
wherein the second pin of the first fly capacitor module is connected to the first pin of the second fly capacitor module by a direct connection without any intervening switches,
the charge pump circuit further arranged to selectively operate according to any one of a set of three alternative operating modes, said set consisting of a 1.5mode, a 2× mode, and a 3× mode, each mode enabling the charge pump circuit to output, at least in a discharging phase, an output voltage which is 1.5, 2 or 3 times the input voltage, respectively;
a supply source chip pin connected to the input terminal and designed to be connected to a supply source with the input voltage,
a ground terminal chip pin connected to the ground terminal and for enabling a connection to the ground voltage,
an output chip pin coupled to the output terminal and arranged to output the output voltage from the charge pump circuit,
first, second, and third chip pins connected to the first and second fly capacitors modules, wherein the first fly capacitor module is connected to the first chip pin, the second fly capacitor module is connected to the second chip pin, and both the first and second fly capacitor modules are commonly connected to the third chip pin,
wherein the charge pump circuit is operated in three phases to provide the 3× boost factor, including two charging phases and a discharging phase, and
wherein the charge pump circuit is operated in three phases to provide the 1.5× boost factor, including a single charging phase and two discharging phases.

14. The chip of claim 13, wherein the charge pump circuit operates according to any one of the set of three alternative operating modes using only two fly capacitors and seven switches, wherein the only two fly capacitors include the first and second fly capacitors.

15. Printed circuit board, PCB, comprising at least a reception slot for a chip according to claim 14, and three conductive traces, each terminated by a different conductive pad designed to be welded to three different chip pins of the chip respectively, the three conductive traces being arranged so that:
one trace connects one pin of a first capacitor module to the conductive pad designed for a first chip pin,
one further trace connects one pin of a second capacitor module to the conductive pad designed for a second chip pin, and further,
one trace connects a second pin of both capacitor modules together and further to the conductive pad designed for a third chip pin, each capacitor module comprising at least one capacitor.

16. The chip of claim 14, wherein the first and second fly capacitor modules are connected to the chip only by the first, second, and third chip pins.

17. The chip of claim 14, wherein the direct connection of the second pin of the first fly capacitor module and the first pin of the second fly capacitor module is connected to the third chip pin.

18. A charge pump circuit, comprising:
an input terminal arranged to receive an input voltage,
an output terminal arranged to output an output voltage and coupled to an intermediate node,
a ground terminal arranged to receive a ground voltage,
a first fly capacitor module with a first fly capacitor, comprising
a first pin connected to the input terminal via a first switch and to the intermediate node via a second switch; and
a second chip pin connected to the input terminal via a third switch, the ground terminal via a fourth switch, and the intermediate node via a fifth switch;
a second fly capacitor module with a second fly capacitor, comprising
a first pin connected to the ground terminal via the fourth switch and the intermediate node via the fifth switch; and
a second pin connected to the ground terminal via a sixth switch and to the input terminal via a seventh switch;
wherein the first and second fly capacitor modules are adapted to successively charge and discharge the first fly capacitor and the second fly capacitor, respectively,
wherein the second pin of the first fly capacitor module is connected to the first pin of the second fly capacitor module at a central node by a direct connection without any intervening switches,
the charge pump circuit further arranged to selectively operate according to any one of a set of three alternative operating modes, said set consisting of a 1.5mode, a 2× mode, and a 3× mode, each mode enabling the charge pump circuit to output, at least in a discharging phase, an output voltage which is 1.5, 2 or 3 times the input voltage, respectively, wherein the charge pump circuit is operated in three phases to provide the 3× boost factor, including two charging phases and a discharging phase, and wherein the charge pump circuit is operated in three phases to provide the 1.5× boost factor, including a single charging phase and two discharging phases.

19. The charge pump circuit of claim 18, wherein the three alternative operating modes are achieved using only the first, second, third, fourth, fifth, sixth, and seventh switches.

20. A method for operating a charge pump circuit, which includes first and second capacitors and a plurality of switches, to boost an input voltage by a factor of 1.5×, 2×, or 3×, the method comprising:

receiving the input voltage on an input terminal;

controlling the plurality of switches of the charge pump circuit to connect and disconnect the first and second capacitors between the input terminal and an output terminal to operate in a first mode to provide the 1.5× boost factor, in a second mode to provide the 2× boost factor, and in a third mode to provide the 3× boost factor, wherein the charge pump circuit is operated in three phases to provide the 3× boost factor, including two charging phases and a discharging phase, and wherein the charge pump circuit is operated in three phases to provide the 1.5× boost factor, including a single charging phase and two discharging phases.

21. The method of claim 20, wherein the plurality of switches comprises a first, a second, a third, a fourth, a fifth, a sixth, and a seventh switch, controlling the plurality switches of the charge pump circuit to provide a 1.5× boost factor comprises controlling, during the single charging phase, the plurality of switches so that the second, third, fourth, fifth, and seventh switches are open and the first and sixth switches are closed, which connects the first and second capacitors in series between the input and ground so that the first and second capacitors are charged, controlling, during a first of the two discharging phases, the plurality of switches so that the first, fourth, fifth, sixth, and seventh switches are open and the second and third switches are closed, which connects the first capacitor between the input and an intermediate node and which connects the first capacitor to the input through a central node so that a charge stored in the first capacitor is added to the input voltage at the output, controlling, during a second of the two discharging phases, the plurality of switches so that the first, second, third, fourth, and sixth switches are open and the fifth and seventh switches are closed, which connects the second capacitor between the input and the intermediate node and which connects the second capacitor between the central and intermediate nodes so that a charge stored in the second capacitor is added to the input voltage at the output, controlling the switches of the charge pump circuit to provide a 2× boost factor comprises controlling, during a single charging phase, the plurality of switches so that the second, third, fifth, sixth, and seventh switches are open and the first and fourth switches are closed, which connects the first capacitor between the input and the ground, wherein the second capacitor is not charged during the single charging phase, controlling, during a single discharging phase, the plurality of switches so that the first, fourth, fifth, sixth, and seventh switches are open and the second and third switches are closed, which connects the first capacitor between the input and an intermediate node so that a charge accumulated in the first capacitor is added to the input voltage, controlling the switches of the charge pump circuit to provide a 3× boost factor comprises controlling, during a first of the two charging phases, the plurality of switches so that the second, third, fifth, sixth, and seventh switches are open and the first and fourth switches are closed, which connects the first capacitor between the input voltage and the ground, wherein the second capacitor is not charged are discharged during the first charging phase, controlling, during a second of the two charging phases, the plurality of switches so that the first, second, fourth, fifth, and seventh switches are open and the third and sixth switches are closed, which connects the second capacitor between the input voltage and the ground, and controlling, during the discharging phase, the plurality of switches so that the first, third, fourth, fifth, and sixth switches are open and the second and seventh switches are closed, which connects the first and second capacitors in series between the input and an intermediate node and charges stored in the first and second capacitors are added to the input voltage to provide a 3× boost at the output terminal.

* * * * *